(12) United States Patent
Yamamoto

(10) Patent No.: US 9,059,829 B2
(45) Date of Patent: Jun. 16, 2015

(54) RECEIVER AND RECEIVED SIGNAL DECODING METHOD

(71) Applicant: Hitachi Kokusai Electric Inc., Tokyo (JP)

(72) Inventor: Keisuke Yamamoto, Kokubunji (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 0 days.

(21) Appl. No.: 13/756,740

(22) Filed: Feb. 1, 2013

(65) Prior Publication Data

US 2013/0208836 A1 Aug. 15, 2013

(30) Foreign Application Priority Data

Feb. 14, 2012 (JP) ................. 2012-029489

(51) Int. Cl.
*H04L 27/06* (2006.01)
*H04L 1/00* (2006.01)
*H04L 1/08* (2006.01)

(52) U.S. Cl.
CPC .............. *H04L 1/0055* (2013.01); *H04L 1/005* (2013.01); *H04L 1/0071* (2013.01); *H04L 1/08* (2013.01)

(58) Field of Classification Search
USPC ........................................ 375/341
See application file for complete search history.

(56) References Cited

U.S. PATENT DOCUMENTS

| 8,291,287 B2* | 10/2012 | Yano et al. ................ 714/752 |
| 2010/0146365 A1* | 6/2010 | Yano et al. ................ 714/752 |

FOREIGN PATENT DOCUMENTS

| JP | 2010-124367 A | 6/2010 |
| WO | 2006/087792 A1 | 8/2006 |

OTHER PUBLICATIONS

X. Li et al: "Bit-Interleaved Coded Modulation with Iterative Decoding", IEEE Communications Letters, vol. 1, No. 6, Nov. 1997, pp. 169-171.

* cited by examiner

*Primary Examiner* — Tanmay Shah
(74) *Attorney, Agent, or Firm* — Mattingly & Malur, PC

(57) ABSTRACT

In a receiver with a demodulator and a decoder performing iterative processing, a solution is provided for reducing the implementation cost of and improving the throughput of an interleaver and a deinterleaver. A receiver includes a symbol demapper outputting first extrinsic information by using one received symbol and a priori information, a check node decoder outputting second extrinsic information by using first extrinsic information and a priori information, a deinterleaver deinterleaving second extrinsic information, a variable node decoder outputting third extrinsic information by using deinterleaved second extrinsic information as a priori information, and an interleaver interleaving third extrinsic information output from the variable node decoder. The check node decoder outputs fourth extrinsic information by using interleaved third extrinsic information as a priori information and the fourth extrinsic information is used as a priori information by the symbol demapper. A plurality of deinterleave/interleaver modules are provided for parallel processing.

7 Claims, 9 Drawing Sheets

RECEIVER AND RECEIVED SIGNAL DECODING METHOD

CLAIM OF PRIORITY

The present application claims priority from Japanese Patent Application 2012-029489 filed on Feb. 14, 2012, the content of which is hereby incorporated by reference into this application.

FIELD OF THE INVENTION

The present invention relates to a wireless communication system, a receiver for use in the wireless communication system, and a received signal decoding method, and particularly to a receiver and a received signal decoding method suitable for carrying out iterative decoding processing at a receiving side for decoding information bits encoded and interleaved (reordered) at a transmitting side, using a demodulator, a deinterleaver, decoder, and an interleaver.

BACKGROUND OF THE INVENTION

A BICM-ID (Bit Interleaved Coded Modulation with Iterative Decoding) system implements MAP (Maximum a posteriori probability) decoding by performing iterative decoding via an interleaving process in which a demodulator and a decoder randomly reorder information bits and a deinterleaving process for restoring these reordered bits to an original sequence of bits.

Lately, a method for analyzing the convergence of iterative decoding processing, which is called EXIT (Extrinsic Information Transfer), has been proposed. This method has revealed the following: i.e., for an encoding method and a modulation method in BICM-ID, even if single performance of each method is not good, they exhibit a good decoding performance as a whole by suitably matching both methods.

In Japanese Patent Application Laid-Open Publication No. 2010-124367, a method is disclosed that combines extended mapping that assigns more bits than a number of normally mappable bits and repetition encoding to obtain a good performance. In U.S. Pat. No. 8,291,287 B2, a method is disclosed that uses regular extended mapping. This method provides extended mapping with certain regularity to reduce computational load, while matching the extended mapping with repetition codes, so that a good performance can be achieved.

SUMMARY OF THE INVENTION

In the methods of Japanese Patent Application Laid-Open publication No. 2010-124367 and U.S. Pat. No. 8,291,287 B2, repetition codes for which the computational load for decoding processing is smaller are used as an encoding method and, thus, the computational load for iterative processing can be reduced. According to the above-mentioned EXIT analysis, a modulation method well matched with repetition codes is such that, whereas only a small amount of information is output in the absence of a priori information from a decoder, the amount of information to be output gradually increases, as a priori information from the decoder increases; so, a method is advantageous that assigns a number of bits that cannot be extracted at the stage of modulator output.

In signal processing, because the computational load increases with an increase in the amount of signals to be processed, extended mapping in which the amount of signals to be handled is reduced at the stage of modulation/demodulation is advantageous. However, after demodulation processing of extended mapping, it is naturally needed to process codeword bits used in encoding in an interleaver and a deinterleaver inserted between a demodulator and a decoder. Processing in the interleaver and the deinterleaver becomes a bottleneck for implementation, because, as the processing load on the interleaver and the deinterleaver increases, the processing speed of the interleaver and the deinterleaver slows down and, besides, circuit size grows.

A problem to be addressed by the present invention is attempting to reduce the implementation cost of and improve the throughput of an interleaver and a deinterleaver inserted between the demodulator and the decoder, in a wireless communication system or a receiver for use in the wireless communication system, in which the demodulator and the decoder exchange information and perform iterative processing.

The present invention provides a means for parallel execution of processing in an interleaver and a deinterleaver, in a wireless communication system or a receiver for use in the wireless communication system, in which a demodulator and a decoder perform iterative processing via an interleaver and a deinterleaver, which is a most principal feature of the invention.

Although the present application includes a plurality of means to address the above-noted problem, a representative aspect of the present invention is as follows.

There is provided a receiver receiving a sequence of symbols converted from given g bits.

The sequence of symbols is generated in such a manner that, after the given bits are encoded, the encoded bits are reordered by interleaving, every L bits of which are reduced to m bits (m<L), and one symbol is assigned to the m bits.

The receiver includes: a symbol demapper outputting one bit of first extrinsic information by using one received symbol and (m−1) bits of a priori information; a check node decoder outputting one bit of second extrinsic information by using m bits of the first extrinsic information output by the symbol demapper with respect to each of m bits corresponding to the one received symbol and (L−1) bits of a priori information; a deinterleaver deinterleaving a plurality of bits of second extrinsic information corresponding to the sequence of symbols in a manner inverse to the interleaving; a variable node decoder outputting one bit of third extrinsic information by using a plurality of bits of second extrinsic information output from the deinterleaver as a priori information; and an interleaver interleaving third extrinsic information output from the variable node decoder in a manner inverse to the deinterleaving. The check node decoder outputs m bits of fourth extrinsic information by using L bits of the third extrinsic information output from the interleaver as a priori information.

The fourth extrinsic information is used as a priori information by the symbol demapper.

A plurality of modules of the deinterleaver and the interleaver are provided for parallel processing of each of interleaving and deinterleaving.

In accordance with the present invention, in a wireless communication system or a receiver for use in the wireless communication system, by parallelizing the processes of interleaving and deinterleaving, it can be accomplished to reduce the implementation cost of and improve the throughput of an interleaver and a deinterleaver.

DETAILED DESCRIPTION OF THE PREFERRED EMBODIMENTS

First Embodiment

The first embodiment provides a way to achieve reducing the implementation cost of and improving the throughput of an interleaver/deinterleaver by parallelization of interleavers/deinterleavers at a receiving side. Parallelization of interleavers at a transmitting side is not necessarily required.

Figure 1:
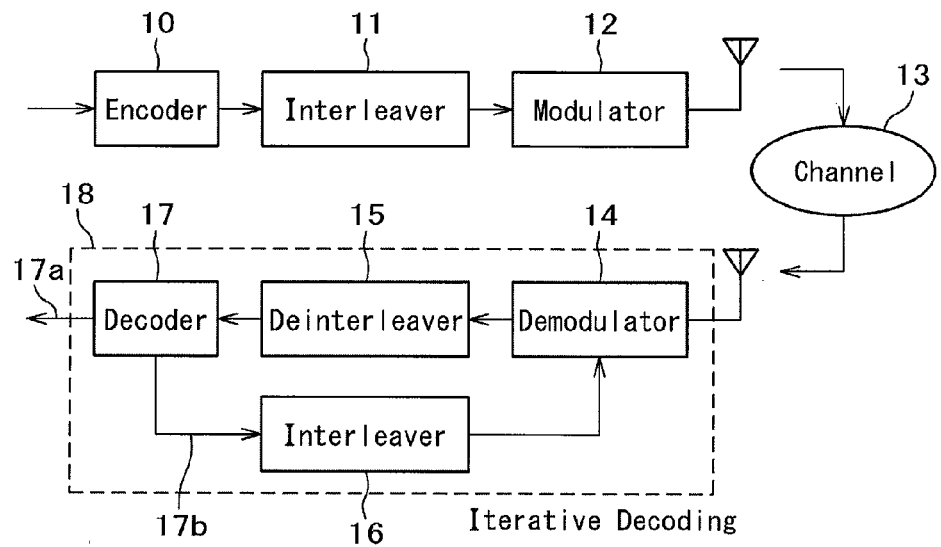
FIG. 1 is an explanatory diagram showing a fundamental architecture of a BICM-ID system.

FIG. 1 is a diagram showing a fundamental architecture of a transmitter and a receiver using a BICM-ID system. This BICM-ID system is the same as a fundamental architecture of an existing BICM-ID system. The transmitter is equipped with an encoder 10, an interleaver 11, and a modulator 12. The receiver is equipped with a demodulator 14, a deinterleaver 15, a decoder 17, and an interleaver 16. Signals transmitted by radio from the transmitter are received by the receiver via a channel 13 which is a radio channel.

In the transmitter, the encoder 10 encodes a given set of information bits (first information bits, e.g., a number of bits g) input to it and outputs encoded bits to the interleaver 11. The interleaver 11 performs interleave processing to randomly reorder all encoded codeword bits (second information bits, e.g., a number of bits h) and thus generates and outputs third information bits to the modulator 12. The modulator 12 performs modulation processing appropriate for the channel 13 and outputs modulated signals from an antenna.

In the receiver, the demodulator 14 demodulates received signals input from an antenna and outputs demodulated signals to the deinterleaver 15. The deinterleaver 15 once stores bit likelihood signals corresponding to all codeword bits (third information bits) encoded and interleaved at the transmitting side, performs deinterleave processing to restore the sequence of bits reordered by the interleaver 11 at the transmitting side to an original sequence of bits, and outputs these bits to the decoder 17. Decoder output bits 17b decoded by the decoder 17 are interleaved again by the interleaver 16 and supplied to the demodulator 14. The demodulator 14 demodulates these bits again using information from the decoder 17.

In this way, an iterative decoding unit 18 is composed of the demodulator 14, deinterleaver 15, decoder 17, and interleaver 16. In the BICM-ID system, the iterative decoding process is performed repeatedly in the iterative decoding unit 18 and, after maximizing the a posteriori probability of signals thus obtained, final decoder output bits 17a (first information bits) are obtained.

Now, a first embodiment of the present invention is described below with the aid of FIGS. 2 through 5.

Figure 2:
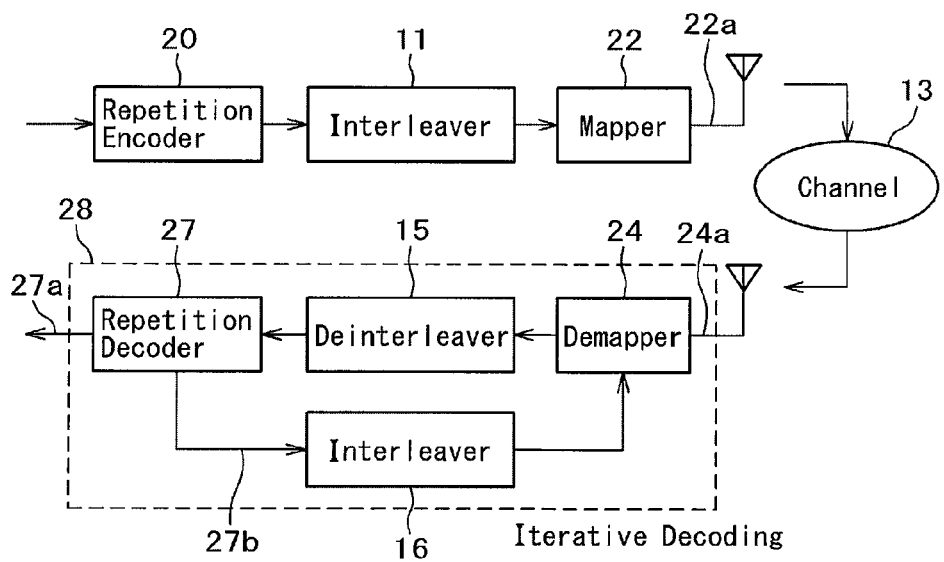
FIG. 2 is an explanatory diagram showing a fundamental architecture of a BICM-ID system according to a first embodiment of the present invention where repetition codes are used.

FIG. 2 shows a BICM-ID system architecture where a repetition encoder 20 that generates repetition codes, i.e., simple codes for which the computation load required for decoding is smaller is used as the encoder 10 in FIG. 1. The same reference numerals are used to denote the same components as in FIG. 1.

In an example of FIG. 2, the repetition encoder 20 that encodes bits into repetition codes of an arbitrary degree dv or a combination of repetition codes of two or more degrees is used as the encoder 10 in FIG. 1. For example, the repetition encoder 20 encodes a set of information bits (first information bits) composed of 3 bits (a1, a2, a3) into second-degree codeword bits (a1, a1, a2, a2, a3, a3) and thus generates second information bits. The interleaver 11 randomly reorders all the codeword bits (a1, a1, a2, a2, a3, a3) and thus generates third information bits.

Besides, in the example of FIG. 2, a mapper 22 is used as a modulator corresponding to the modulator 12 in FIG. 1. For modulation, according to SNR (Signal to Noise Ratio), the mapper 22 can use typical schemes of modulation such as QAM (Quadrature Amplitude Modulation), ASK (Amplitude Shift Keying), PSK (Phase Shift Keying), and FSK (Frequency Shift Keying). Also, the mapper 22 can use extended mapping as well, disclosed in Japanese Patent Application Laid-Open Publication No. 2010-124367 and U.S. Pat. No. 8,291,287 B2. This allows for assignment of more bits even using a modulation scheme with a low number of modulation multiple values and it is possible to configure a modulator (mapper) well matched with repetition codes. In the example of FIG. 2, a mapper that performs extended mapping is used as the mapper (modulator) 22.

Besides, in the example of FIG. 2, a demapper 24 is used as a demodulator corresponding to the demodulator 14 in FIG. 1 and a repetition decoder 27 is used as a decoder corresponding to the decoder 17 in FIG. 1. Details of the demapper 24 and the repetition decoder 27 will be described later as a demapper 44 and a repetition decoder 47. In the example of FIG. 2, an iterative decoding unit 28 is composed of the demapper 24, deinterleaver 15, repetition decoder 27, and interleaver 16.

As regards encoding, an approach of combining repetition code with SPC (Single Parity Check) code having a high coding rate is also advantageous in order to enhance the matching performance of input/output characteristics between the demodulator and the decoder, obtained by the EXIT analysis noted previously. The mapper (modulator) may be configured to perform the above mapping as primary modulation and use OFDM (Orthogonal Frequency Division Multiplexing) or spectrum spreading as secondary modulation.

Figure 3A:
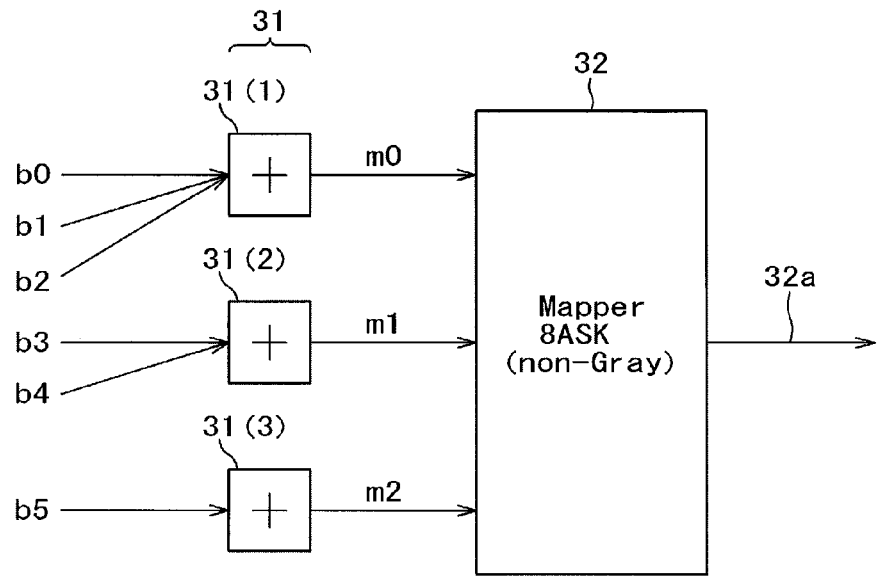
FIGS. 3A and 3B are explanatory diagrams showing the configuration examples of a mapper that performs regular extended mapping and of a demapper that performs demapping in FIG. 2.
Figure 3B:
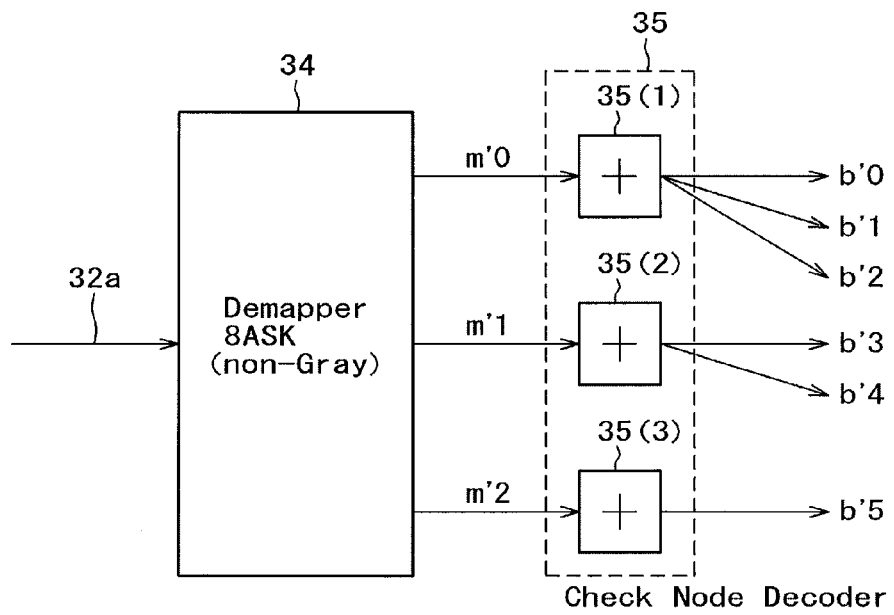

FIGS. 3A and 3B are diagrams showing the configuration examples of a mapper that performs modulation processing by regular extended mapping and of a demapper that performs demodulation processing inversely in the architecture of FIG. 2. Shown in FIG. 3A is a mapper at the transmitting side and the mapper is composed of an XOR (exclusive OR) operation unit 31 for bits reduction processing and an 8ASK mapper 32 for modulation processing, corresponding to the mapper 22 in FIG. 2. Shown in FIG. 3B is a demapper at the receiving side and the demapper is composed of an 8ASK demapper 34 for demodulation processing and a check node decoder for bit demodulation processing, corresponding to the demapper 24 in FIG. 2. A symbol of + in a square in FIGS. 3A and 3B denotes an exclusive OR (XOR: eXculsive OR) operation and demodulation processing, i.e., inverse exclusive OR operation.

As shown in FIG. 3A, at the transmitting side, information bits b0 to b5 (6 bits) encoded by the repetition encoder 20 in FIG. 2 and interleaved by the interleaver 11 are converted and reduced to bits m0 to m2 (3 bits) which are required for the 8ASK mapper 31 by the XOR operation unit 31. Then, these bits m0 to m2 are mapped to one symbol by the 8ASK mapper 32. In this way, a 6-bit codeword is mapped to one symbol in an example of FIG. 3A.

Like this, a sequence of symbols is transmitted by the transmitter, after converted from, e.g., given g bits (first information bits). The sequence of symbols is generated in such a manner that, after the given bits are encoded, the encoded bits are reordered by interleaving, thus generating information bits, every L bits of which are reduced to m bits (m<L), and one symbol is assigned to the m bits.

In FIG. 3A, the XOR operation unit 31 performs bits reduction processing on interleaved codeword bits (b0 to b5 in the example of FIG. 3A) according to two rules described below and obtain reduced bits (m0 to m2 in the example of FIG. 3A).

(1) At least one bit of codeword bits (b0 to b5) is modulated as is without being subjected to an operation with other bits to reduce the number of bits. This is true for bit b5 in the example of FIG. 3A.

(2) Reduced bits (m0 to m2) are obtained by an operation with respectively different bits of an interleaved codeword (b0 to b5). In the example of FIG. 3A, bits b0 to b2 are only used to obtain m0, bits b3, b4 are only used to obtain m1, bit b5 is only used to obtain m2. A same bit of the interleaved codeword should not be used in a plurality of operations to obtain reduced bits.

In a case where a modulator well matched with repetition codes is configured using a plurality of types of mappers, a mapper in which all codeword bits (b0 to b5) used in one symbol are operated with other bits may be used in part. By combining at least two mappers, one of which is such a mapper for which the amount of information that is output in the absence of a priori information becomes 0, adjusting mutual information amounts at the starting point of iterative processing of BICM-ID is also advantageous for adjusting a demodulator's EXIT chart profile.

The reduced bits output from the XOR operation unit 31 are supplied to the modulator (mapper) 32 and modulated. Here, the modulator (mapper 32) performs modulation processing by non-Gray mapping instead of Gray mapping. In the present application, the term "non-Gray mapping" is used to mean that the mapping is not "Gray mapping". The reason for using non-Gray mapping is because the iterative decoding process is performed at the receiving side. Bits are mapped by non-Gray mapping to attain a convergence point in the above-mentioned EXIT chart, so that a large amount of information should be output in a situation that a priori information is almost complete, that is, all other bits than the bits to be demodulated are fixed.

In the case where a modulator well matched with repetition codes is configured using a plurality of types of mappers, Gray mapping may be used in part. By combining at least two mappers, one of which performs Gray mapping for which a large amount of information is output in the absence of a priori information, adjusting mutual information amounts at the starting point of iterative processing of BICM-ID is also advantageous for adjusting a demodulator's EXIT chart profile.

As shown in FIG. 3B, at the receiving side, from a received signal 32a for one received symbol taken from the antenna, bit likelihood signals m'0 to m'2 (3 bits) corresponding to information bits (m0 to m2) encoded after XOR operations at the transmitting side are extracted by using the 8ASK demapper 34. The check node decoder 35 performs demodulation processing for the above XOR operations and outputs information bits b'0 to b'5 (6 bits) which are bit likelihood signals corresponding to the information bits b0 to b5 at the transmitting side. The demodulation processing for the XOR operations in the check node decoder 35 is the same as check node decoder processing according to a Sum-Product algorithm.

Figure 4:
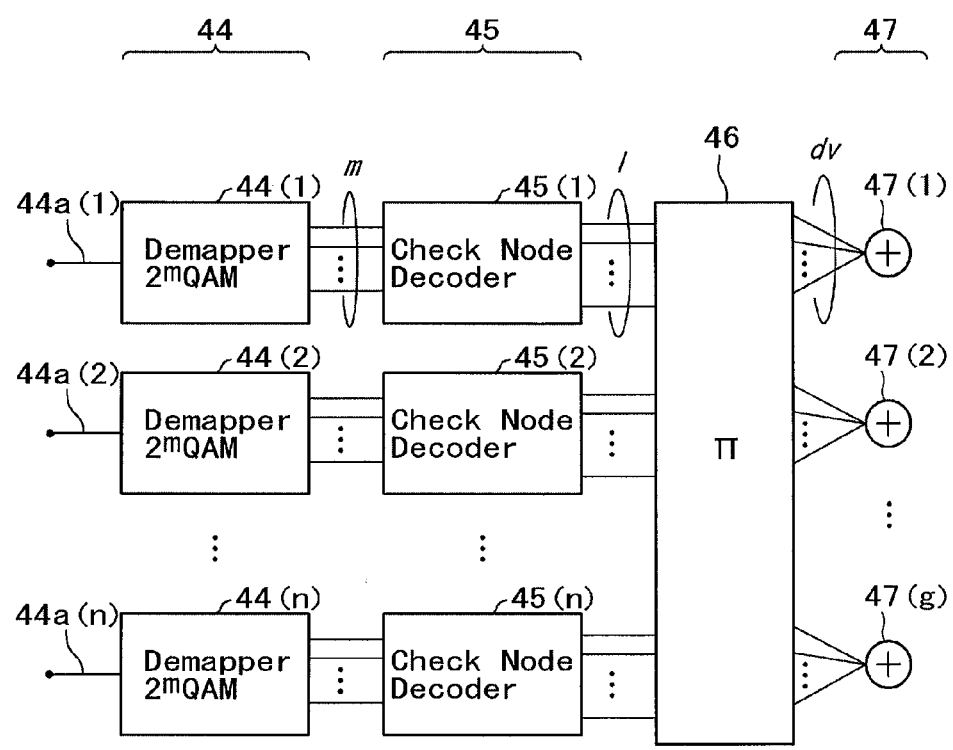
FIG. 4 is an explanatory diagram showing a configuration example of an iterative decoding unit in FIG. 2.

FIG. 4 is a conceptual diagram showing one example of a configuration of the iterative decoding unit 28 in FIG. 2. In an example of FIG. 4, a demapper is composed of $2^m$QAM demapper modules 44 and corresponds to the 8ASK demapper 24 in FIG. 3B. A check node decoder 45 corresponds to the check node decoder 35 in FIG. 3B.

In FIG. 4, the demapper 44 is composed of a demapper module 44 (1) demapping a received signal 44a (1) of a first received symbol in one codeword, a demapper module 44 (2) demapping a received signal 44a (2) of a second received symbol in one codeword, and so forth, up to a demapper module 44 (n) demapping a received signal 44a (n) of an n-th received symbol in one codeword. The demapper modules 44 (1) to 44 (n) are collectively termed as the demapper 44.

The check node decoder 45 is composed of a check node decoder module 45 (1) converting bit likelihood signals of m bits (m'0 to m'2, if m=3) output from the demapper module 44 (1) to bit likelihood signals of L bits, a check node decoder module 45 (2) converting bit likelihood signals of m bits output from the demapper module 44 (2) to bit likelihood signals of L bits, and so forth, up to a check node decoder module 45 (n) converting bit likelihood signals of m bits output from the demapper module 44 (n) to bit likelihood signals of L bits. The check node decoder modules 45 (1) to 45 (n) are collectively termed as the check node decoder 45.

An interleaver/deinterleaver 46 is a unit that has the functions of the deinterleaver 15 and the interleaver 16 in FIG. 2 and is composed of a deinterleaver 46a and an interleaver 46b. The deinterleaver 46a corresponds to the deinterleaver 15 and the interleaver 46b corresponds to the interleaver 16. The deinterleaver 46a deinterleaves signals from the check node decoder 45 and outputs deinterleaved signals to a repetition decoder 47. The interleaver 46b interleaves signals from the repetition decoder 47 and outputs interleaved signals to the check node decoder 45.

The repetition decoder 47 is a variable node decoder that performs decoding processing on repetition codes of degree dv and restores them to information bits that are g bits long before repetition encoding. This decoding processing is addition of LLR (Log-Likelihood Ratio) values and is denoted by a symbol of + in a circle.

FIG. 4 is a conceptual diagram for illustrative purposes. In a practical circuit, instead of providing a plurality of modules of the demapper 44 and the check node decoder 45 for each received symbol as in FIG. 4, it is preferable to use a single demapper 44 and a single check node decoder 45 and carry out processing in time series in order to prevent the circuit size from growing.

As shown in FIG. 4, signals 44a input to the demapper 44 are, after demapped by the demapper 44, converted to bit likelihood signals of a codeword by the check node decoder 45. The sequence of the bit likelihood signals of randomly reordered codeword bits is restored to the original sequence by the deinterleaver 46a and these signals are decoded by the repetition decoder 47. From the decoded results and a priori information, extrinsic information (corresponding to 27b in FIG. 2) is calculated and, via the interleaver 46b, this information is used as a priori information by the check node decoder 34 and the QAM demapper 44 and iterative decoding is performed. In FIG. 4, the interleaver/deinterleaver 46 stores a set of all codeword bits in one codeword and is able to reorder all the codeword bits in one codeword.

This processing is explained below, taking an example of extended mapping of a 6-bit codeword to 3 bits, for example, as in FIGS. 3A and 3B. Received signals 44a for one symbol input to the demapper 44 are demapped by the demapper 44 into bit likelihood signals of 3 bits (m'0 to m'2) which are in turn converted to bit likelihood signals of 6 bits (b'0 to b'5) by the check node decoder 45. The deinterleaver 46a stores all bits contained in one codeword (for example, h bits, i.e., the number of the above-mentioned second information bits). The sequence of bit likelihood signals (b'0, and so forth, up to the number of bits h) of randomly reordered codeword bits is restored to the original sequence and these signals are decoded by the repetition decoder 47, and iterative decoding is performed. Thereby, finally, the above-mentioned first information bits (g bits) originally contained in one codeword are obtained.

Processing of the iterative decoding unit shown in FIG. 4 is explained in detail.

Signals contained in one received symbol are processed as follows. First, the QAM demapper module 44 (1) performs QAM demodulation processing by using a received signal 44a (1) and a priori information from the check node decoder 45 and outputs m bits of first extrinsic information. When calculating extrinsic information for a certain bit, this demodulation processing calculates first extrinsic information by using a priori information on bits other than the relevant bit in the same symbol (m−1 bits) and the received signal. The first extrinsic information is generally output in form of LLR. LLR is a logarithmic representation of a ratio between probability that the bit is 0 and probability that the bit is 1 and can be expressed by Equation 1.

$$L(b) = \log\frac{P(b=0)}{P(b=1)} \quad \text{[Equation 1]}$$

where, P (b=0) means probability in which b is 0 and P (b=1) means probability in which b is 1.

Other bits in the same symbol are demodulated in the same way as described above and LLRs for m bits are calculated and output from one received symbol. In first time iterative processing, because a priori information is not obtained from the check node decoder 45, LLR is assumed to be 0.

LLRs for m bits per received symbol are supplied to the check node decoder module 45 (1) as a priori information and decoding processing is performed. The check node decoder module 45 (1) outputs second extrinsic information (L bits) on bits to be decoded by using a priori information (first extrinsic information) supplied from the QAM demapper module 44 (1) and a priori information supplied from the interleaver 46b. This decoding processing does not use the LLR of the relevant bit supplied from the interleaver 46b in calculation and calculates second extrinsic information by calculating an algorithm provided in Equation 2 with regard to (L−1) bits of a priori information on other bits input from the interleaver 46b and m bits that are output from the QAM demapper 44 (1) as the first extrinsic information and supplied as a priori information.

$$L(u_1 \boxplus u_2 \boxplus \wedge \boxplus u_n) = 2\operatorname{arctanh}\left(\prod_{i=1}^{n}\tanh\frac{L(u_i)}{2}\right) \quad \text{[Equation 2]}$$

In Equation 2, $u_1$ denotes an output from the QAM demapper 44 (1) and $u_2$, and so forth, up to $u_n$ denote outputs from the interleaver 46b. Equation 2 performs XOR operation of $u_1$, $u_2$, and so forth, up to $u_n$.

In Equation 2, the following Equations are applied.

$$\tanh x = \frac{e^x - e^{-x}}{e^x + e^{-x}} \quad \text{[Equation 3]}$$

$$\operatorname{arctanh} x = \frac{1}{2}\log\frac{1+x}{1-x} \quad \text{[Equation 4]}$$

This processing is the same as check node decoder processing according to a Sum-Product algorithm which is known as a decoding algorithm of LDPC codes.

More specifically, a check node decoder 35 in FIG. 3B corresponding to the XOR operation unit 31 shown in FIG. 3A executes processing as follows. In order to calculate second extrinsic information about b'0, the check node decoder 35 calculates the above algorithm (Equation 2) with regard to m'0, b'1, and b'2. Likewise, in order to calculate second extrinsic information about b'4, the check node decoder 35 calculates the above algorithm (Equation 2) with regard to a priori information on m'1 and b'3. As for second extrinsic information about b'5, the check node decoder 35 outputs a priori information on m'2 as is. Here, b'5 is unaffected by bits reduction and this is very important in carrying out the present invention. That is, in first time iterative processing, a priori information is not supplied from the interleaver 46b (LLR=0). Thus, if there is not b'5 that can be output as second extrinsic information without a priori information from the interleaver 46b, the result of calculating the algorithm (Equation 2) will be 0 and a demodulation result will not be supplied to the repetition decoder 47. As above, in the case that the XOR operation unit 31 in FIG. 3A is used, a demodulation result that is only b'5 is to be supplied to the repetition decoder 47 in first time processing.

By the above-described processing, L bits of second extrinsic information per symbol are calculated from the check node decoder 45 and supplied to the deinterleaver 46a. Once second extrinsic information for all symbols has been stored in the deinterleaver 46a, the second extrinsic information, the sequence of which has been reordered by the deinterleaver 46a, is supplied to the repetition decoder 47 as a priori information. The repetition decoder 47 performs decoding according to processing in consistency with the repetition encoder 20 which is the encoder 10 at the transmitting side. Assuming that the repetition encoder 20 executes replicating one bit to dv bits, dv pieces of LLRs for one signal are obtained by the deinterleaver 46a as a priori information. Thus, the repetition decoder 47 performs decoding according to variable node decoder processing which is provided in Equation 5.

$$L(u_1 + u_2 + \wedge + u_n) = \sum_{i=1}^{n} L(u_i)$$ [Equation 5]

In Equation 5, $u_1$, $u_2$, and so forth, up to $u_n$ denote outputs from the deinterleaver 46a. Equation 5 adds $u_1$, $u_2$, and so forth, up to $u_n$ together.

This processing is the same as variable node decoder processing according to a Sum-Product algorithm which is known as a decoding algorithm of LDPC codes. In this case also, like the foregoing check node decoder 45, the repetition decoder 47 executes a calculation with regard to extrinsic information only on other bits than a bit whose extrinsic information should be obtained. Thus, the repetition decoder 47 executes vd times the calculation of Equation 5 that calculates extrinsic information for one bit from a priori information for (dv−1) bits, thereby calculating third extrinsic information for all replicated bits.

By the way, such a method is also generally used that calculates a posteriori information using a priori information for all bits and subtracts from the calculated a posteriori information the a priori information on a bit whose extrinsic information should be obtained, thus obtaining the extrinsic information.

Dv pieces of third extrinsic information for dv bits per bit calculated by the repetition decoder (variable node decoder) 47 are supplied via the interleaver 46b to the check node decoder 45 again. The check node decoder 45 calculates m bits of fourth extrinsic information from L bits of a priori information (third external information). More specifically, the check node decoder executes the calculation of Equation 2 with regard to a priori information on the given number of bits for which XOR operations were executed in the bits reduction processing at the transmitting side. For example, if the XOR operation unit 31 for bits reduction processing as shown in FIG. 3A is provided at the transmitting side, in order to calculate fourth extrinsic information about m'0, the check node decoder uses a priori information on b'0, b'1, and b'2. As for m'1, the check node decoder executes the calculation using a priori information on b'3 and b'4. As for m'2, the check node decoder outputs a priori information on b'5 as is. The thus obtained m bits of fourth extrinsic information for one symbol are supplied to the QAM demapper 44 and subjected to QAM demodulation processing described previously.

As above, the processing operations of the QAM demapper 44, check node decoder 45, deinterleaver 46a, repetition decoder 47, and interleaver 46b are executed iteratively. After a certain number of time of iteration enough for the processing to converge, the repetition decoder 47 calculates decoding results at the respective variable nodes 47 (1), and so forth, up to 47 (g). Because the decoding results are obtained in terms of LLRs of a posteriori probability, the repetition decoder 47 calculates a priori information on all dv bits according to Equation 5 with and obtains output of one information bit respectively at each variable node 47.

Next, a feature part of the present invention is described.

Figure 5:
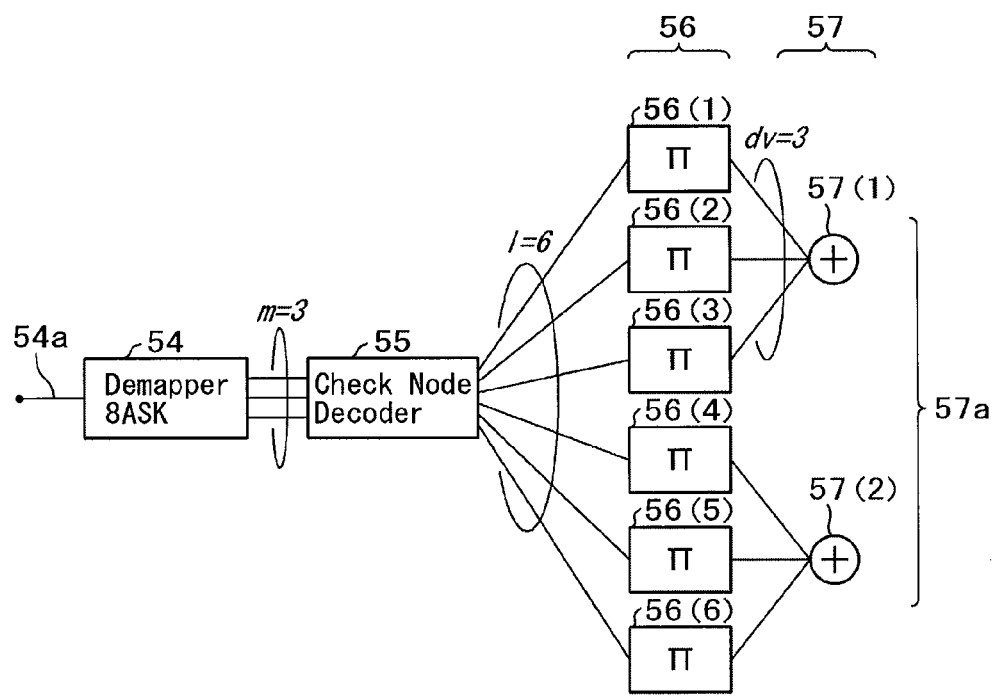
FIG. 5 is an explanatory diagram showing one example of a configuration of an iterative decoding unit adopting parallelization according to the first embodiment of the present invention.

FIG. 5 is a diagram showing one example of a configuration of an iterative decoding unit according to the first embodiment. This diagram shows one example of a configuration of, for example, the iterative decoding unit 28 in FIG. 2. In the iterative decoding unit in FIG. 5, an interleaver/deinterleaver 56 is divided into a plurality of interleaver/deinterleaver modules that operate in parallel. Like this, making the interleaver/deinterleaver 56 composed of the plurality of interleaver/deinterleaver modules that operate in parallel is one feature of the present invention.

Each interleaver/deinterleaver module 56 is composed of a deinterleaver 56a and an interleaver 56b, like the interleaver/deinterleaver 46 in FIG. 4. Signals from a check node decoder 55 are deinterleaved by the deinterleaver 56a and output to a repetition decoder 57. Signals from the repetition decoder 57 are interleaved by the interleaver 56a and output to the check node decoder 55.

In FIG. 5, it is assumed that processing of the iterative decoding unit is performed on units of one received symbol of ASK modulated received signals 54a and the interleaver/deinterleaver 56, after storing signals for all bits constituting one codeword, performs reordering the bits. In FIG. 5, the interleaver/deinterleaver 56 is divided into a plurality of inter-leaver/deinterleaver modules 56 (1), and so forth, up to 56 (6). The interleaver/deinterleaver modules 56 (1), and so forth, up to 56 (6) are collectively termed as the interleaver/deinterleaver 56.

Given that the number of first information bits before being encoded at the transmitting side is g, the number of all bits of one codeword (the number of second information bits after being encoded) is h, and the number of interleaver/deinterleaver modules that operate in parallel is k (k=6 in an example of FIG. 5), the number of bit likelihood signals to be reordered by one interleaver/deinterleaver module will be h/k. By dividing the interleaver/deinterleaver 56 into modules, it is possible to enhance the operating speed of the entire interleaver/deinterleaver and to decrease the circuit size of the entire interleaver/deinterleaver. However, codeword bits that can be reordered by each interleave/deinterleave module are limited to a fraction of all bits (h bits) constituting one codeword. Consequently, a result of randomly reordering bits is liable to become rather systematic than random, which may lead to deterioration in a communication system characteristic (the convergence characteristic of BICM-ID).

In FIG. 5, an 8ASK demapper 54 calculates bit likelihood signals (m'0 to m'2), for which the number of outputs m=3, from a priori information (fourth extrinsic information) from the check node decoder 55 which will be described later and received signals 54a for one received symbol, and outputs these signals to the check node decoder 55 as first extrinsic information.

The check node decoder 55 calculates bit likelihood signals (b'0 to b'5) of a codeword, for which the number of outputs L=6, based on the outputs (m'0 to m'2) from the 8ASK demapper 54 and a priori information from the interleaver 56b, and outputs these signals to the deinterleaver 56a as second extrinsic information. The entire deinterleaver 56a stores bit likelihood signals for all h bits constituting one codeword (bits contained in all received symbols), restores the sequence of the bit likelihood signals for the above h bits interleaved to an original sequence, and outputs each set of 6 bits of these signals to the decoder 57. For example, a deinter-leaver 56a (1) stores bit likelihood signals (b'0, b'6, b'12, and so forth) and a deinterleaver 56a (2) stores bit likelihood signals (b'1, b'7, b'13, and so forth) and restores the sequence of the stored bit likelihood signals to an original sequence, and the entire deinterleaver 56*a* outputs each set of 6 bits to the decoder 57.

The decoder 57, which is a repetition decoder of degree 3 in the example of FIG. 5, calculates from its decoding results third extrinsic information to be input to the check node decoder 55 as a priori information and outputs each set of 6 bits of this information to the interleaver 56*b*. The entire interleaver 56*b* reorders the sequence of third extrinsic information for all h bits and outputs each set of 6 bits of this information to the check node decoder 55. Using the interleaved third extrinsic information from the interleaver 56*b*, the check node decoder 55 generates and outputs fourth external information to the 8ASK demapper 54 as a priori information. In this way, iterative decoding is performed. In consequence of this iterative decoding, 2 bits of final decoder outputs 57*a* per symbol are obtained from the decoder 57. In this way, the above-mentioned first information bits (g bits) for all received symbols are obtained.

According to the first embodiment described above, by dividing the interleaver/deinterleaver into modules, it is possible to enhance the operating speed of the entire interleaver/deinterleaver and to decrease the circuit size of the entire interleaver/deinterleaver.

Here, codeword bits (e.g., b0 to b5) for which regular extended mapping was performed have input/output characteristics of each different mutual information amounts and, in BICM-ID, convergence of the iterative decoding unit is designed on the assumption that an average characteristic of the above characteristics is obtained in the demapper processing. In the iterative decoding unit in FIG. 5, because a given number of codeword bits are input to each of the interleaver/deinterleaver modules parallelized, the input/output characteristics of mutual information amounts differ from those designed intrinsically and this may lead to insufficient convergence of BICM-ID in some cases. A method for improving the convergence of BICM-ID is described in the following embodiment.

Second Embodiment

Figure 6:
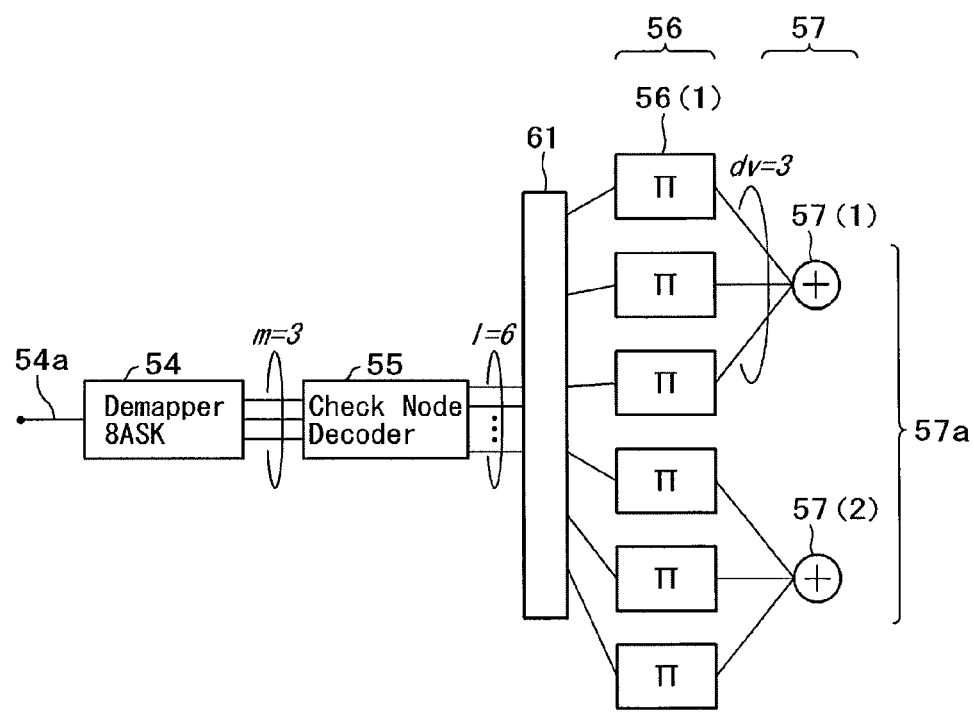
FIG. 6 is an explanatory diagram showing one example of a configuration of an iterative decoding unit adopting parallelization according to a second embodiment of the present invention.

A second embodiment is described using FIG. 6. The second embodiment uses a resequencer that rearranges a sequence of codeword bits, e.g., 6 bits of codeword bits b'0 to b'5, output from the check node decoder between the check node decoder and the interleaver/deinterleaver in order to improve the convergence of BICM-ID. FIG. 6 is a diagram showing a configuration of an iterative decoder using the resequencer 61 in the configuration of FIG. 5. The same reference numerals are used to denote the same components as in FIG. 5.

The resequencer 61 is a multi-port selector with L inputs and L outputs and implements a plurality of different input/output connection states. The resequencer 61 is generally configured using a shift register and a multiplexer. In an example shown in FIG. 6, the check node decoder 55 and the interleaver/deinterleaver 56 are connected through the use of the resequencer 61 for which the number of inputs and the number of outputs are both L=6.

For example, in a case where a simple cyclic shift register is used as the resequencer 61, codeword bits output from the check node decoder are to be evenly allocated to each interleaver/deinterleaver module 56 and the input/output characteristics of mutual information amounts in demapper processing will become an average of the characteristics of the bits.

Therefore, it is possible to attain the convergence characteristic of BICM-ID as designed if a codeword with a sufficient length is used, although there remains a factor of deteriorating the above characteristics due to the fact that interleaving can only be applied to reorder codeword bits corresponding to a fraction of all codeword bits as the result of dividing the interleaver/deinterleaver 56 into modules.

According to the second embodiment described above, owing to providing the resequencer that rearranges a sequence of codeword bits output from the check node decoder, codeword bits output from the check node decoder can evenly be allocated to each interleaver/deinterleaver module. Thus, codeword bits that are used in calculation by the repetition decoder become to have a lower correlation with each other. It is thus possible to suppress deterioration in the convergence characteristic of BICM-ID due to the fact that a result of reordering codeword bits is liable to become rather systematic than random in consequence of dividing the interleaver/deinterleaver into modules.

Third Embodiment

Figure 7:
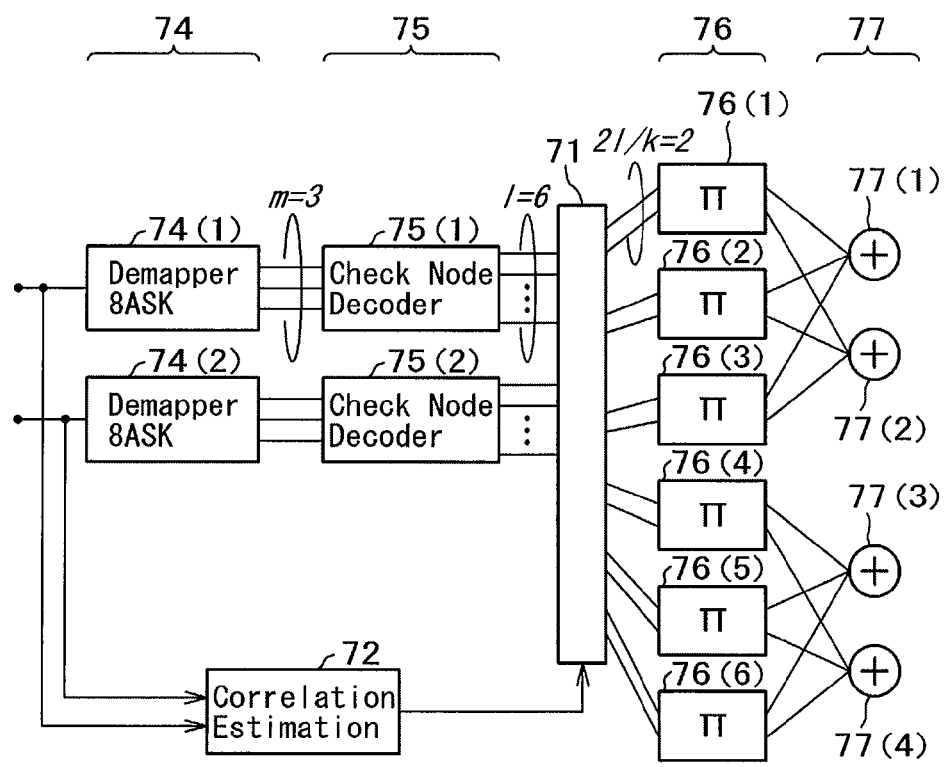
FIG. 7 is an explanatory diagram showing a configuration of an iterative decoding unit adopting parallelization, in which resequencing bits is performed by referring to a result of correlation estimation, according to a third embodiment of the present invention.

Next, a third embodiment is described using FIG. 7. In the third embodiment, a method for suppressing deterioration in the convergence characteristic of BICM-ID in consequence of dividing the interleaver/deinterleaver into modules is provided. This is accomplished by biasing the characteristics of codeword bits that are input to interleaver/deinterleaver modules and suitably setting up the connections between the interleaver/deinterleaver modules and repetition decoder modules.

FIG. 7 is a diagram showing an iterative decoding unit according to the third embodiment. In FIG. 7, an 8ASK demapper 74 is composed of two modules: 8ASK demapper 74 (1) and 8ASK demapper 74 (2). A check node decoder 75 is composed of two modules: check node decoder 75 (1) and check node decoder 75 (2). An interleaver/deinterleaver 76 is composed of six interleaver/deinterleaver modules 76 (1) to 76 (4). A repetition decoder 77 is comprised four repetition decoder modules 77 (1) to 77 (4). The functions of the 8ASK demapper 74, check node decoder 75, interleaver/deinterleaver 76, and repetition decoder 77 are the same as the functions of the 8ASK demapper 54, check node decoder 55, interleaver/deinterleaver 56, and repetition decoder 57 in FIG. 5.

In FIG. 7, processing of the iterative decoding unit is performed on units of two received symbols of received signals, for example, by two 8ASK demapper modules 74. By increasing the degree of parallelization in the iterative decoding unit, it is possible to enhance the throughput. However, as described previously, increasing the degree of parallelization of interleaver/deinterleaver modules leads to a noticeable deterioration in the convergence characteristic of BICM-ID due to the fact that a result of reordering codeword bits is liable to become rather systematic than random.

In FIG. 7, a resequencer 71 has 2×L inputs and outputs. In an example of FIG. 7, L=6. Here, in a case where a simple cyclic shift register is used, as is the case for the resequencer 61 in the second embodiment, codeword bits output from the check node decoder modules 75 (1) and 75 (2) are to be evenly allocated to each interleaver/deinterleaver module 76 and the input/output characteristics of mutual information amounts in demapper processing will become an average of the characteristics of the bits.

The iterative decoding unit of FIG. 7 further includes a correlation estimation unit 72 that estimates correlation in terms of distortion and noise of signals that are input to the two demapper modules 74, respectively. If the correlation estimation unit 72 has determined that correlation between both is lower than a predetermined criterion, the resequencer 71 rearranges a sequence of codeword bits only among codeword bits (6 bits) output by an individual check node decoder module 75 so as to prevent the outputs of different check node decoder modules 75 from being input to a same interleaver/deinterleaver module, that is, so that the output of a same check node decoder module 75 is input to a same interleaver/deinterleaver module. For example, the outputs of the check node decoder modules 75 (1) and 75 (2) are prevented from being input to a same interleaver/deinterleaver module 76 (1). In this way, it is possible to simplify the structure of each interleaver/deinterleaver module and to enhance the processing speed of each interleaver/deinterleaver module.

In this case, if the output characteristics of the interleaver/deinterleaver modules are uneven, the outputs of certain interleaver/deinterleaver modules have a higher correlation than in a case where all interleaver/deinterleaver modules have even characteristics, and the outputs of other interleaver/deinterleaver modules have a low correlation. Thus, if the connections between the interleaver/deinterleaver modules 76 and the repetition decoder modules 77 are arbitrarily selected, bit likelihood signals that are input to a subset of decoder modules 77 become to have a high correlation and deterioration in decoding performance is liable to occur.

Hence, the interleaver/deinterleaver modules 76 and the decoder modules 77 are connected such that at least two of the interleaver/deinterleaver modules connected to a decoder module 77 separately take in codeword bits that are output from different check node decoder modules 75. For example, to a decoder module 77 (1), an interleaver/deinterleaver module 76 (1) to which only the output from a check node decoder module 75 (1) is input and an interleaver/deinterleaver module 76 (2) to which only the output from a check node decoder module 75 (2) is input are connected.

By connecting them in this way, the correlation between codeword bits that are used in calculation of the decoder 77 becomes low, because the correlation between the outputs of difference check node decoder modules 75 is low. It becomes possible to suppress deterioration in the convergence characteristic of BICM-ID due to the fact that a result of reordering codeword bits is liable to become rather systematic than random in consequence of dividing the interleaver/deinterleaver 76 into modules.

If the correlation estimation unit 72 has determined that the correlation of channels that are input to the two demapper modules 74 is equal to or more than the predetermined criterion, the iterative decoding unit of FIG. 7 does not perform processing based on output of the correlation estimation unit 72, as described above. That is, it performs the same processing as for the iterative decoding unit of FIG. 6 (second embodiment) which is not provided with the correlation estimation unit 72.

By the way, when changing a bit reordering pattern used by an interleaver at the receiving side, it is necessary to change the same bit reordering pattern used by an interleaver at the transmitting side. In a case where a bit reordering pattern is dynamically changed, changing the bit reordering pattern should be synchronized between transmitting and receiving devices.

The iterative decoding unit of the third embodiment is provided with the correlation estimation unit that estimates correlation in terms of distortion and noise of received signals that are input to a plurality of demapper modules, respectively. If the correlation estimation unit has determined that correlation in terms of distortion and noise of received signals that are input to the demapper modules is lower than a predetermined criterion, the resequencer rearranges a sequence of codeword bits only among codeword bits output by an individual check node decoder module to which the output of each of the demapper modules is input so as to prevent the outputs of different check node decoder modules from being input to a same interleaver/deinterleaver module. The iterative decoding unit is further configured so as to connect the interleaver/deinterleaver modules and the decoder modules such that at least two of the interleaver/deinterleaver modules connected to a decoder module separately take in codeword bits that are output from different check node decoder modules. That is, the iterative decoding unit is configured to separate the outputs from the demapper modules into bit groups with low correlation, perform interleave/deinterleave processing for each of the bit groups with low correlation, and use at least two of the bit groups as inputs to one repetition decoder module.

Therefore, according to the third embodiment, in a case when correlation in terms of distortion and noise of received signals that are input to the demapper modules is low, it is possible to simplify the structure of and enhance the processing speed of the interleaver/deinterleaver modules as well as to suppress deterioration in the convergence characteristic of BICM-ID in consequence of dividing the interleaver/deinterleaver into modules.

Fourth Embodiment

Figure 8:
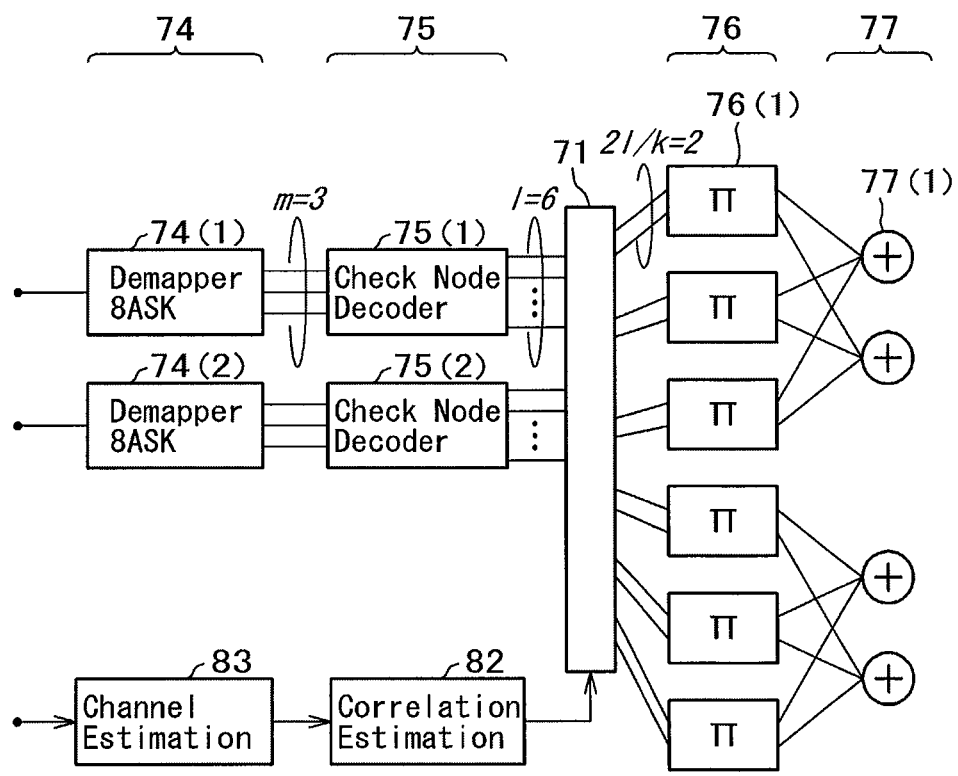
FIG. 8 is an explanatory diagram showing a configuration of an iterative decoding unit adopting parallelization, in which resequencing bits is performed based on channel information, according to a fourth embodiment of the present invention.

Next, a fourth embodiment is described using FIG. 8. In the fourth embodiment, a resequencer operates based on channel correlation.

FIG. 8 is a diagram showing a configuration of an iterative decoding unit provided with a correlation estimation unit 82 and a channel estimation unit 83 instead of the correlation estimation unit 72 in the iterative decoding unit of FIG. 7 (third embodiment). In this configuration, the correlation estimation unit 82 can receive channel information from the channel estimation unit 83. The iterative decoding unit of FIG. 8 includes the channel estimation unit 83 that estimates correlation in terms of distortion and noise of a plurality of channels. A symbol demapper 74 is composed of a plurality of symbol demapper modules, each demodulating received symbols on a plurality of channels. The same reference numerals are used to denote the same components as in FIG. 7. Interleaver/deinterleaver modules 76 and decoder modules 77 are connected in the same manner as in FIG. 7.

In the iterative decoding unit of FIG. 8, the correlation estimation unit 82 estimates correlation in terms of distortion and noise of signals that are input to two demapper modules 74, respectively, based on channel information estimated by the channel estimation unit 83. If the correlation estimation unit 82 has determined that correlation between both is lower than a predetermined criterion, as is the case for FIG. 7, the resequencer 71 rearranges a sequence of codeword bits only among codeword bits (6 bits) output by an individual check node decoder module 75 so as to prevent the outputs of different check node decoder modules 75 from being input to a same interleaver/deinterleaver module. In this way, it is possible to simplify the structure of each interleaver/deinterleaver module and to enhance the processing speed of each interleaver/deinterleaver module.

Moreover, interleaver/deinterleaver modules and repetition decoder modules 77 are connected such that at least two of the interleaver/deinterleaver modules connected to a repetition decoder module 77 separately take in codeword bits that are output from different check node decoder modules 75.

If the correlation estimation unit 82 has determined that correlation in terms of distortion and noise of received signals that are input to two demapper modules 74 is equal to or more than the predetermined criterion, the iterative decoding unit of FIG. 8 does not perform processing based on output of the correlation estimation unit 82 and the channel estimation unit 83, as described above. That is, it performs the same processing as for the iterative decoding unit of FIG. 6 (second embodiment) which is not provided with the correlation estimation unit 82 and the channel estimation unit 83.

According to the fourth embodiment, if the correlation estimation unit has determined that correlation in terms of distortion and noise of received signals that are input to a plurality of demapper modules is lower than a predetermined criterion, based on channel information estimated by the channel estimation unit that estimates channel correlation, the resequencer rearranges a sequence of codeword bits only among codeword bits output by an individual check node decoder module so as to prevent the outputs of different check node decoder modules from being input to a same interleaver/deinterleaver module. The iterative decoding unit is further configured so as to connect the interleaver/deinterleaver modules and the decoder modules such that at least two of the interleaver/deinterleaver modules connected to a decoder module separately take in codeword bits that are output from different check node decoder modules. Therefore, in a case when correlation in terms of distortion and noise of received signals that are input to the demapper modules is low, it is possible to simplify the structure of and enhance the processing speed of the interleaver/deinterleaver modules as well as to suppress deterioration in the convergence characteristic of BICM-ID in consequence of dividing the interleaver/deinterleaver into modules.

Fifth Embodiment

Figure 9:
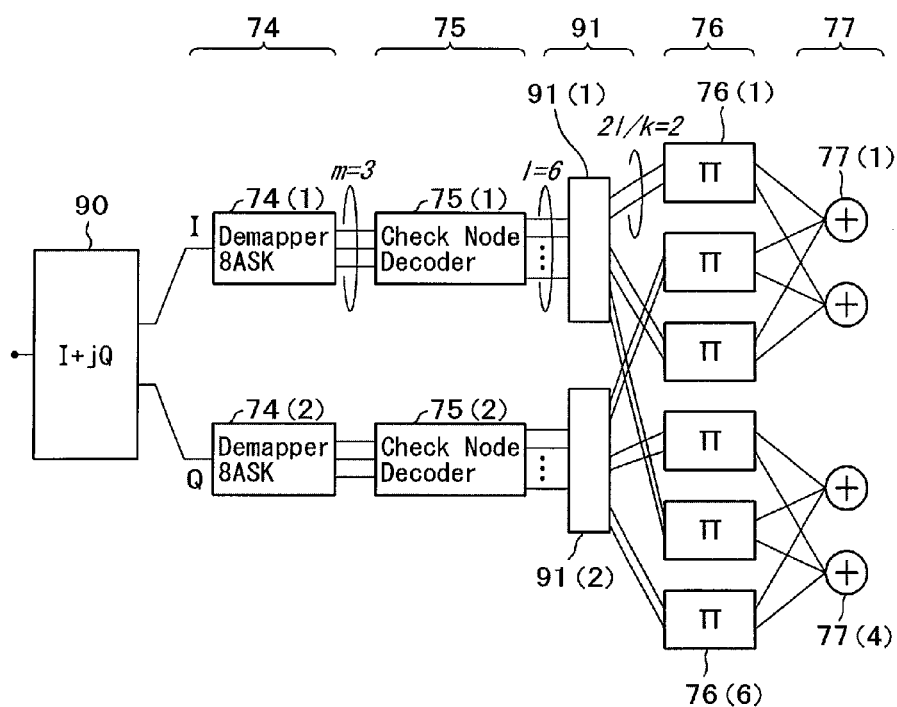
FIG. 9 is an explanatory diagram showing a configuration of an iterative decoding unit adopting parallelization, in which resequencing bits is performed based on I-axis and Q-axis signals, according to a fifth embodiment of the present invention.

Next, a fifth embodiment is described using FIG. 9. In the fifth embodiment, separate resequencers are provided for a case of processing received signals expected to have low correlation beforehand.

FIG. 9 is a diagram showing a configuration of an iterative decoding unit of the fifth embodiment, in which received signals that are processed by two demapper modules for regular extended demapping are I-axis and Q-axis signals of quadrature modulation in the iterative decoding unit of FIG. 7 (third embodiment). It is known that I-axis signals (I signals) and Q-axis signals (Q signals) each have low correlation in terms of distortion and noise. The same reference numerals are used to denote the same components as in FIG. 7. Interleaver/deinterleaver modules 76 and decoder modules 77 are connected in the same manner as in FIG. 7.

In the iterative decoding unit of FIG. 9, received signals are separated into I signals and Q signals which are orthogonal to each other in a quadrature demodulator 90. I signals are input to an 8ASK demapper module 74 (1) and Q signals are input to an 8ASK demapper module 74 (2).

A resequencer 91 (1) rearranges a sequence of codeword bits only among codeword bits (6 bits) output by a check node decoder module 75 (1) and a resequencer 91 (2) rearranges a sequence of codeword bits only among codeword bits (6 bits) output by a check node decoder module 75 (2). In this way, the outputs of different check node decoder modules 75 (1) and 75 (2) are prevented from being input to a same interleaver/deinterleaver module. In this way, it is possible to simplify the structure of each interleaver/deinterleaver module and to enhance the processing speed of each interleaver/deinterleaver module.

Moreover, interleaver/deinterleaver modules and repetition decoder modules 77 are connected such that at least two of the interleaver/deinterleaver modules connected to a repetition decoder module 77 separately take in codeword bits that are output from different check node decoder modules 75.

As illustrated in FIG. 9, in a case that received signals expected to have low correlation beforehand are processed in parallel by the demapper modules 74, it is advantageous to provide separate resequencers without applying control from a correlation estimator.

According to the fifth embodiment, in a case in which it is known beforehand that correlation in terms of distortion and noise of received signals that are input to a plurality of demapper modules is lower than a predetermined criterion, resequencers are provided, each of which following each check node decoder module. Each resequencer rearranges a sequence of codeword bits only among codeword bits output by an individual check node decoder module so as to prevent the outputs of different check node decoder modules from being input to a same interleaver/deinterleaver module. The iterative decoding unit is further configured so as to connect the interleaver/deinterleaver modules and the decoder modules such that at least two of the interleaver/deinterleaver modules connected to a decoder module separately take in codeword bits that are output from different check node decoder modules. Therefore, in a case that I signals and Q signals having low correlation in terms of distortion and noise are input to different demapper modules, it is possible to simplify the structure of and enhance the processing speed of the interleaver/deinterleaver modules as well as to suppress deterioration in the convergence characteristic of BICM-ID in consequence of dividing the interleaver/deinterleaver into modules.

Sixth Embodiment

Figure 10:
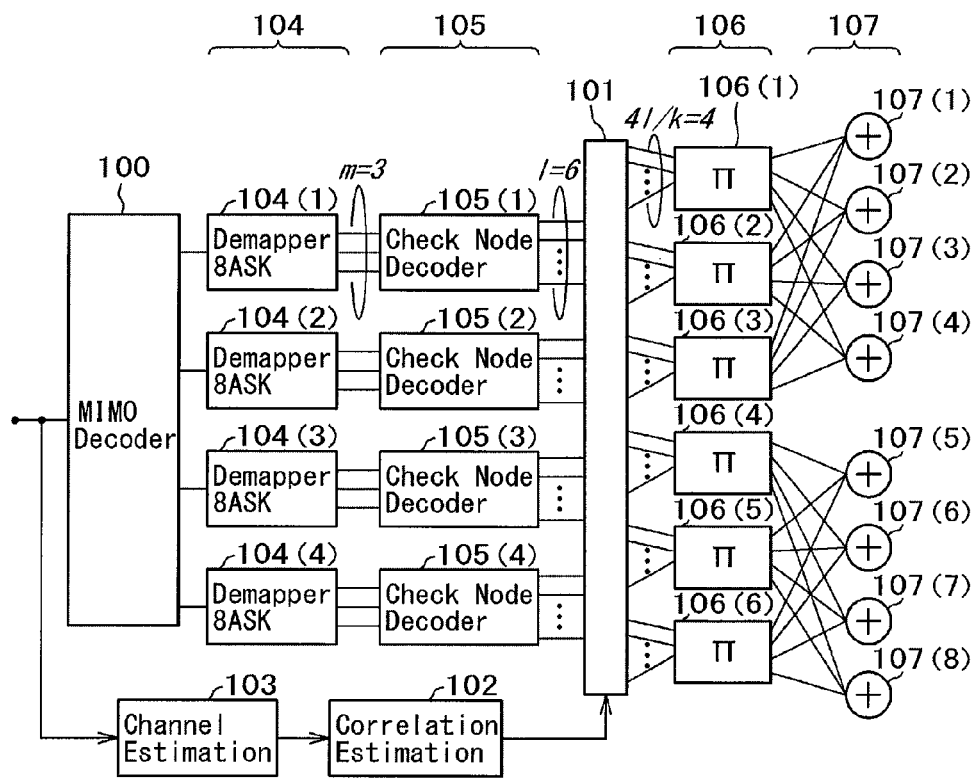
FIG. 10 is an explanatory diagram showing a configuration of an iterative decoding unit adopting parallelization, in which resequencing bits is performed based on a channel matrix, according to a sixth embodiment of the present invention.

Next, a sixth embodiment is described using FIG. 10. In the sixth embodiment, a configuration of an iterative decoding unit using BICM-ID combined with MIMO (Multiple Input Multiple Output) is described. FIG. 10 is a diagram showing a configuration of an iterative decoding unit at the receiving side in a case where four symbols generated by regular extended 8ASK mapping are transmitted in parallel from the transmitting side by means of MIMO. The functions of an 8ASK demapper 104, a check node decoder 105, an interleaver/deinterleaver 106, and a repetition decoder 107 are the same as the functions of the 8ASK demapper 74, check node decoder 75, interleaver/deinterleaver 76, and repetition decoder 77 in FIG. 7 (third embodiment).

In FIG. 10, a MIMO decoder (MIMO signal processing unit) 100 has a function of separating received signals into four received symbols equivalent to SISO (Single Input Single Output). Four received symbols equivalent to SISO output from the MIMO decoder 100 are input to 8ASK demapper modules 104 (1) to 104 (4) respectively. Bit likelihood signals (3 bits) output from the respective 8ASK demapper modules 104 are input to check node decoder modules 105 (1) to 105 (4) respectively. Bit likelihood signals (6 bits) output from the check node decoder modules 105 (1) to 105 (4) are input to a resequencer 101.

In the iterative decoding unit of FIG. 10, a channel (matrix) estimation unit 103 calculates a channel correlation matrix of four channels separated equivalent to SISO, based on channel information. A correlation estimation unit 102 estimates correlation of the channels that are input to four demapper modules 74 respectively based on the channel correlation matrix calculated by the channel (matrix) estimation unit 103.

If the correlation estimation unit 102 has determined that correlation of the channels that are input to the four demapper modules 104 respectively is lower than a predetermined criterion, as is the case in the iterative decoding unit of FIG. 7, the resequencer 101 rearranges a sequence of codeword bits only among codeword bits (6 bits) output by an individual check node decoder module 105, but does not rearrange a bit sequence that is a mixture of codeword bits output by a plurality of check node decoder modules 105 corresponding to the respective channels. In this way, it is possible to simplify the structure of each interleaver/deinterleaver module and to enhance the processing speed of each interleaver/deinterleaver module.

Then, adjustment is made so that the respective outputs of the channels having low channel correlation, that is, the respective outputs of different check node decoder modules 105 are input to different interleaver/deinterleaver modules. Output destinations of the interleaver/deinterleaver modules are adapted, that is, the connections between interleaver/deinterleaver modules 106 and decoder modules 107 are adapted, so that the outputs of different interleaver/deinterleaver modules are used as much as possible by a same repetition decoder for its processing.

If the correlation estimation unit 102 has determined that correlation of the channels that are input to the four demapper modules 104 respectively is equal to or more than the predetermined criterion, the iterative decoding unit of FIG. 10 does not perform processing based on output of the channel estimation unit 103 and the correlation estimation unit 102, as described above. That is, it performs the same processing as for the iterative decoding unit of FIG. 6 (second embodiment) which is not provided with the channel estimation unit 103 and the correlation estimation unit 102.

According to the sixth embodiment, if the correlation estimation unit has determined that correlation in terms of distortion and noise of the channels that are input to a plurality of demapper modules is lower than a predetermined criterion, based on channel information estimated by the channel (matrix) estimation unit that calculates a channel correlation matrix of the multiple channels, the resequencer rearranges a sequence of codeword bits only among codeword bits output by an individual check node decoder module so as to prevent the outputs of different check node decoder modules from being input to a same interleaver/deinterleaver module. The iterative decoding unit is further configured so as to connect the interleaver/deinterleaver modules and the decoder modules such that at least two of the interleaver/deinterleaver modules connected to a decoder module separately take in codeword bits that are output from different check node decoder modules. Therefore, it is possible to simplify the structure of and enhance the processing speed of the interleaver/deinterleaver modules as well as to suppress deterioration in the convergence characteristic of BICM-ID in consequence of dividing the interleaver/deinterleaver into modules.

It is obvious that the present invention is not limited to the foregoing embodiments and various modifications may be made thereto without departing from the scope of the invention.

In the foregoing second through sixth embodiments, the resequencer is disposed in a stage preceding the interleaver/deinterleaver; however, the resequencer may be placed in a stage following the interleaver/deinterleaver in an alternative configuration.

What is claimed is:

1. A receiver receiving a sequence of symbols converted from given g bits (where g is an integer greater than zero),
    wherein the sequence of symbols is generated in such a manner that, after the given bits are encoded, the encoded bits are reordered by interleaving, thus generating information bits, every L bits of which are reduced to m bits (where m and L are integers greater than zero which satisfy m<L), and one symbol is assigned to the m bits,
    the receiver comprising:
    a symbol demapper outputting one bit of first extrinsic information by using one received symbol and (m−1) bits of a priori information;
    a check node decoder outputting one bit of second extrinsic information by using m bits of the first extrinsic information output by the symbol demapper with respect to each of m bits corresponding to the one received symbol and (L−1) bits of a priori information;
    a deinterleaver deinterleaving a plurality of bits of second extrinsic information corresponding to the sequence of symbols in a manner inverse to the interleaving;
    a variable node decoder outputting one bit of third extrinsic information by using a plurality of bits of second extrinsic information output from the deinterleaver as a priori information;
    an interleaver interleaving third extrinsic information output from the variable node decoder in a manner inverse to the deinterleaving; and
    a resequencer disposed in at least one stage preceding or following the interleaver and the deinterleaver,
    wherein the check node decoder outputs m bits of fourth extrinsic information by using L bits of the third extrinsic information output from the interleaver as a priori information,
    wherein the fourth extrinsic information is used as a priori information by the symbol demapper,
    wherein a plurality of modules of the deinterleaver and the interleaver are provided for parallel processing of each of interleaving and deinterleaving,
    wherein the resequencer, if disposed in the preceding stage, rearranges a sequence of bits of the second extrinsic information to be input to the deinterleaver and rearranges a sequence of bits of the third extrinsic information output from the interleaver, and
    wherein the resequencer, if disposed in the following stage, rearranges a sequence of bits of the second extrinsic information output from the deinterleaver and rearranges a sequence of bits of the third extrinsic information to be input to the interleaver.

2. The receiver according to claim 1, further comprising a correlation estimation unit that estimates correlation in terms of distortion or noise of a plurality of received symbols that are input to the symbol demapper,
    wherein the variable node decoder includes g pieces of variable node decoder modules, and
    wherein, if the correlation estimation unit determines that correlation in terms of distortion or noise of a plurality of received symbols is lower than a predetermined criterion, the resequencer performs bit resequencing in a controlled manner so that an output of one module of the check node decoder for a same received symbol is input to a same module of the deinterleaver and, besides, modules of the deinterleaver and the variable node decoder modules are connected such that at least two of the deinterleaver modules connected to one of the g pieces of variable node decoder modules separately take in outputs of check node decoder modules corresponding to different received symbols.

3. The receiver according to claim 2, further comprising a channel estimation unit that estimates correlation in terms of distortion or noise of a plurality of channels,
wherein the symbol demapper includes a plurality of symbol demapper modules, each demodulating received symbols on the plurality of channels, and
wherein, if the correlation estimation unit determines that correlation in terms of distortion or noise of received symbols on the plurality of channels is lower than a predetermined criterion, based on channel information estimated by the channel estimation unit, the resequencer performs bit resequencing in the controlled manner, and the modules of the deinterleaver and the variable node decoder modules are connected such that at least two of the deinterleaver modules connected to one of the g pieces of variable node decoder modules separately take in outputs of check node decoder modules corresponding to different received symbols.

4. The receiver according to claim 1, further comprising a quadrature demodulator that receives the sequence of symbols and outputs I signals and Q signals which are orthogonal to each other,
wherein the symbol demapper includes a symbol demapper module (I) processing I signals and outputting first extrinsic information (I) and a symbol demapper module (Q) processing Q signals and outputting first extrinsic information (Q),
wherein the check node decoder includes a check node decoder module (I) outputting second extrinsic information (I) based on the first extrinsic information (I) and a check node decoder module (Q) outputting second extrinsic information (Q) based on the first extrinsic information (Q), and
wherein a resequencer (I) that rearranges a sequence of bits of the second extrinsic information (I) to be input to the deinterleaver and rearranges a sequence of bits of the third extrinsic information output from the interleaver is disposed in a stage preceding the interleaver and the deinterleaver and a resequencer (Q) that rearranges a sequence of bits of the second extrinsic information (Q) to be input to the deinterleaver and rearranges a sequence of bits of the third extrinsic information output from the interleaver is disposed in the stage preceding the interleaver and the deinterleaver.

5. The receiver according to claim 3, further comprising one or more antennas at least receiving signals and a multiple input multiple output (MIMO) signal processing unit separating received signals into a plurality of channels equivalent to single input single output (SISO),
wherein a plurality of modules of the symbol mapper are provided so as to correspond to the plurality of channels equivalent to SISO respectively and each symbol demapper module processes received signals from the MIMO signal processing unit and outputs first extrinsic information corresponding to each channel equivalent to SISO,
wherein a plurality of modules of the check node decoder are provided so as to correspond to the plurality of modules of the symbol mapper and each check node decoder module outputs second extrinsic information based on the first extrinsic information for each channel,
wherein the channel estimation unit estimates correlation in terms of distortion or noise of the plurality of channels equivalent to SISO, and
wherein, if the correlation estimation unit determines that correlation in terms of distortion or noise of the plurality of channels equivalent to SISO is lower than a predetermined criterion, based on information representing correlation of the plurality of channels equivalent to SISO estimated by the channel estimation unit, the resequencer performs bit resequencing in the controlled manner, and the modules of the deinterleaver and the variable node decoder modules are connected such that at least two of the deinterleaver modules connected to one of the g pieces of variable node decoder modules separately take in outputs of check node decoder modules corresponding to different received symbols.

6. A received signal decoding method comprising:
a receiving step for receiving a sequence of symbols generated in such a manner that, after a given g bits (where g is an integer greater than zero) are encoded, the encoded bits are reordered by interleaving, thus generating information bits, every L bits of which are reduced to m bits (where m and L are integers greater than zero which satisfy m<L), and one symbol is assigned to the m bits;
a symbol demapping step for generating one bit of first extrinsic information by using one received symbol received by the receiving step and (m−1) bits of a priori information;
a first check node decoding step for generating one bit of second extrinsic information by using m bits of the first extrinsic information output with respect to each of m bits corresponding to the one received symbol and (L−1) bits of a priori information;
a deinterleaving step for executing in parallel a process of deinterleaving a plurality of bits of second extrinsic information corresponding to the sequence of symbols in a manner inverse to the interleaving;
a variable node decoding step for generating one bit of third extrinsic information by using a plurality of bits of the deinterleaved second extrinsic information as a priori information;
an interleaving step for executing in parallel a process of interleaving the generated third extrinsic information in a manner inverse to the deinterleaving;
a second check node decoding step for generating m bits of fourth extrinsic information by using L bits of the interleaved third extrinsic information as a priori information;
a first rearranging step for rearranging a sequence of bits of the second extrinsic information to be input to the deinterleaver; and
a second rearranging step for rearranging a sequence of bits of the third extrinsic information output from the interleaver,
wherein the fourth extrinsic information is used as a priori information by the symbol demapping step.

7. A received signal decoding method comprising:
a receiving step for receiving a sequence of symbols generated in such a manner that, after a given g bits (where q is an integer greater than zero) are encoded, the encoded bits are reordered by interleaving, thus generating information bits, every L bits of which are reduced to m bits (where m and L are integers greater than zero which satisfy m<L), and one symbol is assigned to the m bits;
a symbol demapping step for generating one bit of first extrinsic information by using one received symbol received by the receiving step and (m−1) bits of a priori information;

a first check node decoding step for generating one bit of second extrinsic information by using m bits of the first extrinsic information output with respect to each of m bits corresponding to the one received symbol and (L−1) bits of a priori information;

a deinterleaving step for executing in parallel a process of deinterleaving a plurality of bits of second extrinsic information corresponding to the sequence of symbols in a manner inverse to the interleaving;

a variable node decoding step for generating one bit of third extrinsic information by using a plurality of bits of the deinterleaved second extrinsic information as a priori information;

an interleaving step for executing in parallel a process of interleaving the generated third extrinsic information in a manner inverse to the deinterleaving, and a second check node decoding step for generating m bits of fourth extrinsic information by using L bits of the interleaved third extrinsic information as a priori information;

a first rearranging step for rearranging a sequence of bits of the second extrinsic information output from the deinterleaver; and a second rearranging step for rearranging a sequence of bits of the third extrinsic information to be input to the interleaver, wherein the fourth extrinsic information is used as a priori information by the symbol demapping step.

\* \* \* \* \*